United States Patent
Izumi et al.

[11] Patent Number: 6,026,064
[45] Date of Patent: Feb. 15, 2000

[54] HEAD DRIVING APPARATUS AND OPTICAL DISK APPARATUS

[75] Inventors: Haruhiko Izumi; Tadashi Sato; Takayuki Kawabe, all of Kawasaki, Japan

[73] Assignee: Fujitsu Limited, Kawasaki, Japan

[21] Appl. No.: 08/928,301

[22] Filed: Sep. 12, 1997

[30] Foreign Application Priority Data

May 1, 1997 [JP] Japan ...................................... 9-114090

[51] Int. Cl.[7] .................................................. G11B 7/085
[52] U.S. Cl. ...................................... 369/44.22; 369/44.14
[58] Field of Search ............................. 369/44.22, 44.21, 369/44.14, 44.15, 44.16

[56] References Cited

U.S. PATENT DOCUMENTS

| | | | |
|---|---|---|---|
| 4,570,249 | 2/1986 | Malissin et al. | 369/44.22 |
| 5,191,570 | 3/1993 | Shirai | 369/44.22 |
| 5,218,587 | 6/1993 | Nomiyama et al. | 369/44.22 |

FOREIGN PATENT DOCUMENTS 1106372   4/1989   Japan .

*Primary Examiner*—Thang V. Tran
*Attorney, Agent, or Firm*—Greer, Burns & Crain, Ltd.

[57] ABSTRACT

A head driving apparatus has two yokes each having two generally parallel members which extend respectively in the direction generally perpendicular to the optical axis of a lens, and the yokes are disposed on both sides of the two side surfaces of the head. Two tubular head driving coils are fixed to the head and externally fitted on the member of each yoke, which is nearer to the head. At least a first magnet is fixed to the member of each yoke lying further from the head. A plurality of second magnets are fixed to the head and oppose the first magnets. The head is supported in a non-contact state by the repulsive forces of the first magnets and the second magnets, and the head is driven by energizing the head driving coils. An optical disk apparatus is equipped with the head driving apparatus.

20 Claims, 13 Drawing Sheets

HEAD DRIVING APPARATUS AND OPTICAL DISK APPARATUS

BACKGROUND OF THE INVENTION

The present invention relates to a head driving apparatus for driving a head which is furnished with a lens for condensing a light beam in order to carry out recording and/or reproducing information by irradiating the light beam on an optical recording medium and an optical disk apparatus with the head driving apparatus.

An optical disk apparatus for reproducing, or recording and reproducing information by irradiates a light beam on a recording surface of a rotating optical disk or optomagnetic disk. Utilization of this type of apparatus as an external recording apparatus for the computer is expanding because it has a large recording capacity in comparison with other recording/reproducing apparatus which records the information on the magnetic disk or the magnetic tape.

In such an optical disk apparatus, it is necessary to scan the disk in a radial direction with the light beam for recording and reproducing and to position the light beam spot correctly on a track formed concentrically or spirally on the recording face of the disk. For this purpose, the optical disk apparatus is provided with a head driving apparatus for moving the head for reflecting and condensing the light beam irradiated from the fixed light source in the radial direction of the disk. By driving the head driving apparatus, an access control is made to move the spot of the light beam irradiated on the recording surface from the head to the required track, and track control is made to have the spot follow the position displacement of the track caused by the eccentricity of the disk.

FIG. 1 is a perspective view showing the conventional head driving apparatus. In the drawing, an approximately rectangular, parallel piped carriage 36 is provided on a head 35. Guide shafts 32, 32 guide the carriage 36 and are parallel with each other at a predetermined distance on the back surface side of the optical disk so that the central line between the two guide shafts 32, 32 is in the radial direction of the disk. The carriage 36 is provided with through holes 45, 45, approximately the same diameters as the guide shafts 32, 32, piercing through the carriage 36 from the front to the back side, at a predetermined distance. The guide shafts 32, 32 pass through the two through holes 45, 45 respectively, and the carriage 36 is slidably supported in the radial direction of the disk.

At the front center of the carriage 36 there is provided a light conductive hole 41 provides access into the carriage 36 for a light beam B that is parallel with the through holes 45, 45. The light beam B is received from a fixed light source (not shown) disposed opposite to the light conductive hole 41 and its make incident on the light conductive hole 41. The part opposite to the light conductive hole 41 on the upper surface of the carriage 36 has an opening with an area near the end of the direction of opening of the light conductive hole 41 left as margin, and the remaining part being formed into a supporting part 36a of a lens holder 37 to be described later. To the upper and lower surfaces of the supporting part 36a, one end of each of leaf springs 40, 40 with U-letter shaped nicks is fixed, respectively. The lens holder 37 has openings on the upper and lower parts, having a tubular shape with the transverse surface being a long rectangle in the direction of the length of the carriage 36, and is held is a cantilever by the leaf springs 40,40 which are connected on the upper and lower surfaces of the front side of the carriage 36 for the lens holder 37.

On the front side of the carriage 36 in the lens holder 37, an objective lens 38 is fixed in parallel with the upper surface of the carriage 36. The objective lens 38 condenses the light beam B that was raised by the rising mirror which is disposed in opposed state underneath the objective lens 38 and emits the beam to the disk. On the back surface side of the carriage 36 in the lens holder 37, there is inserted a single leg of an U-shaped yoke 42 for focusing which is erected on the carriage 36. To the inner surface of the other leg of the yoke 42 for focusing, a magnet for focusing 43 is fixed. Also, on the peripheral surface of the lens holder 37 a focusing coil 39 is wound in multiplex form around the axis parallel with the optical axis of the objective lens 38. The focusing coil 39 is orthogonal with the magnetic field formed by the magnet for focusing 43 and the yoke for focusing 42 as described above.

On both side surfaces of the carriage 36 there are fixed tubular driving coils 46, 46 wound in multiplex form around the axis parallel with the guide shafts 32, 32. Also, on both sides of the carriage 36 are disposed tubular yokes 33, 33 having openings up and down and having rectangular shapes of approximately the same lengths as the guide shafts 32, 32 in the transverse surface so that the side surfaces of both yokes 33, 33 in the lengthwise direction are parallel with the side surface of the carriage 36. Each of the driving coils 46, 46 as described above is externally set without contact over one of the side wall opposite to the carriage 36, of each of the two yokes 33, 33. On the inner surfaces of the other side walls opposite to said side walls of both yokes 33, 33 there are fitted long plate form magnets 34, 34 having approximately the same length as the side walls of the yokes 33, 33, so that the magnetic field formed by the magnets 34, 34 and yokes 33, 33 is orthogonal with a part of the driving coils 46, 46.

Next, the head driving principle and the lens driving principle as given above will be explained.

FIG. 2 is an illustrative view to explain the driving principle of the conventional head driving apparatus, and FIG. 3 is an illustrative view to explain the driving principle of the conventional lens driving apparatus. In FIGS. 2 and 3, the parts corresponding to those given in FIG. 1 are indicated with the same numbers and their explanations omitted. As shown in FIG. 2, the winding of the driving coil 46 is set in transverse in the magnetic field lying from the magnet 34 to the one side wall of the yoke 33 opposite to it. When normal and reverse electric current is led to the driving coil 46, by the reciprocal action with the magnetic field, the carriage 36 supporting the driving coil 46 (ref. FIG. 1) moves frontward or backward in the lengthwise direction of the yoke 33, i.e., in the radial direction of the disk.

In such a head driving apparatus, the track error between the position of the spot of the light beam irradiated on the disk and the position of the track is optically detected to form an error signal, and the predetermined electric current is led to the driving coil 46 so as to make the error signal zero to operate the motor as a so-called VCM (Voice Coil Motor), thereby carrying out the track control as mentioned above.

Also, as shown in FIG. 3, a part of the winding of the focusing coil 39 is set in transverse in the magnetic field lying from the magnet for focusing 43 to the single leg of the yoke for focusing 42 opposite to it. By leading electric current to the focus coil 39, by the reciprocal action with the magnetic field and the spring force of the leaf springs 40, 40, the lens holder 37 supporting the focusing coil 39 and the objective lens 38 are advanced or retracted in the direction of the optical axis of the objective lens 38 through which the light beam B reflected on the rising mirror 48 passes to make focus control.

However, such a head driving apparatus involves the following problems.

FIG. 4 is a graph showing the relation between the error signal and the driving coil current in the case where a track control is in practice, wherein the upper side shows an error signal and the lower side shows the current of the driving coil, respectively. The abscissa shows the time, and the ordinate shows the error signal value or the current value of the driving coil, respectively, and the time for one turn of the disk is shown by T. As shown in FIG. 4, the current corresponding to the error signal value is led to the driving coil, and the feedback type control is practiced to make the difference between the position of the spot of the light beam irradiated on the disk and the position of the track zero.

Now, when the change of the error signal is specially noted, the error signal shows great change in the direction of the inverse mark at the rate of twice in a cycle of rotation of the disk, and the position of the light beam spot is largely displaced to the outer peripheral side or the inner peripheral side of the track position. When recording or reproducing is made at such time, there is a possibility for errors to occur to provide a problem of low reliability in recording and reproducing.

This state can be explained in the following manner. In the case where the disk is eccentric, the track position is largely displaced to the outer periphery side and inner periphery side of the disk while the disk rotates one cycle, in comparison with the case of no eccentricity. At the changing point where the displacement is changed from the inner (outer) periphery side to the outer (inner) periphery side, the carriage temporarily stops. In order to drive again the carriage again after it is at a standstill, large current is required to be led to the driving coil so as to give a relatively large driving force that is higher than standstill friction. Since the tracking control is a feed-back type as described above, the position of the spot of the light beam and the position of the track are required to be largely displaced.

For the above purpose, Japanese Patent Application Laid-open No. 1-106372 (1989) discloses the following head driving apparatus. The two driving coils fitted to the carriage have triangular shapes in front view. Into these two driving coils, instead of the yokes 33, 33 as shown in FIG. 1, guide rails formed of permanent magnets into triangular posts are respectively inserted through so that one side surface of the guide rail and the side surface of the carriage face to each other. On the center line of the side surfaces facing to the carriages of both guide rails there are provided the grooves, respectively. To the parts facing to the groove of the carriage guide rail there are fixed the bar-shaped permanent magnets having convex parts which are to be accommodated into the groove. The sectional areas of the convex parts of the two permanent magnets are made smaller than the sectional areas of said grooves, and both permanent magnets and guide rails are so made that the convex parts of the permanent magnets and the grooves of the guide rails repulse one another. And, by this repulsive force the carriage is supported on the guide rails under non-contact state.

On the outside of the driving coil there are provided flat plate form permanent magnets facing the two side surfaces not provided with the guide rail grooves, so that the driving coil runs in transverse state in the magnetic circuits by the guide rails and the two permanent magnets. On the other hand, in the carriage, as shown in FIG. 1, there is provided a lens driving apparatus equipped with a magnetic circuit having a yoke and a permanent magnet provided with the yoke, and a coil running in transverse of the magnetic circuit, so as to make focusing control by the lens driving apparatus.

In such head driving apparatus, in the same manner as in the above, the required electric current is run onto the driving coil by the feedback type control to move the carriage in the radial direction by the reciprocal action with the magnetic circuit as described above. At this time, as the carriage is supported to the guide rail under non-contact state, no standstill friction is formed, and even if the disk has eccentricity, the track control can be made without large displacement between the light beam spot position and the track position and there is no apprehension for the error to occur in recording and reproducing.

However, in the head driving apparatus disclosed in Japanese Patent Application Laid-Open No. 1-106372 (1989), the carriage is supported in non-contact state by the guide rail of the permanent magnet and the permanent magnet attached to the carriage, and the tracking control is executed by using the magnetic circuit including the guide rails and the flat plate form permanent magnets disposed in facing state to the guide rail. For this purpose, a large number of long permanent magnets are required to be used in the radial direction of the disk. Since the permanent magnet comprises rare earth metals having high unit price, the conventional head driving apparatus involves a problem of high production cost. Moreover, as it is necessary to provide a supporting members for supporting the flat plate form permanent magnets disposed in opposite manner to the guide rail, there are required a large number of parts for the head driving apparatus.

BRIEF SUMMARY OF THE INVENTION

The present invention has been devised to solve the above problems. An object of the present invention is to provide a head driving apparatus which is producible with small amount of use of permanent magnets and number of parts, and low in production cost and an optical disk apparatus equipped with it, by adopting such a configuration as to support the head in non-contact state by the repulsive force between the first magnet provided on the yoke and the second magnet provided on the head and to move the head in the lengthwise direction of the first magnet by utilizing the magnetic field formed by the first magnet and the yoke.

The head driving apparatus and the optical disk apparatus provided with it according to the present invention are characterized in that, in a head driving apparatus comprising a plurality of first magnets having a predetermined length disposed in parallel with one another, a head having a lens for condensing the light beam, which is disposed between the first magnets, a plurality of second magnets provided respectively on the parts opposite to the first magnet of the head, and tubular two head driving coils, so that the head which is supported in non-contact state by the repulsive forces between the first magnet and the second magnet is driven in the lengthwise direction of the first magnet by energizing the head driving coil provided on the head, the rectangular frame shaped two yokes having approximately the same size as the length of the first magnet are disposed respectively with one side of each yoke opposed to the head, at least one first magnet is fixed respectively to both yokes, the second magnets are disposed respectively on one side of the yoke, the head driving coil is fitted from outside to the parts opposite to the head, of the two yokes, the head is supported in non-contact state by the repulsive force between the first magnet and the second magnet, so that, by energizing the two head driving coils, the head is to be moved in the lengthwise direction of the first magnet by utilizing the magnetic field formed by the first magnet and the yoke.

Accordingly, by the repulsive force between the second magnets which are disposed on respective one sides of the two yokes of rectangular frame shape having openings of approximately the same size as the length of the first magnet, and the first magnets which are disposed in parallel with each other on both sides of the head, the head is freely movably supported in the lengthwise direction of the first magnet without causing contact of the first magnet and yoke with the second magnet and head.

Furthermore, the head driving coil which is externally fitted on the parts opposite to the head, of the two yokes is fixed to the head. By energizing the required current to the head driving coil, by the reciprocal action with the magnetic field formed by the first magnet and the yoke, the head to which the coil is fixed is advanced and retracted in the lengthwise direction of the first magnet, i.e., radial direction of the disk-form recording medium. By this step, the amount of use of the magnet in the case of supporting the head in non-contact state is decreased, and the number of parts can be reduced by supporting the first magnet by the yoke, so that the production cost is low.

Moreover, the present invention is characterized in that, both yokes have a first part disposed opposite to the head and having the smaller width than the size of the head height, and a rectangular second part which is parallel with the first part and having a width larger than that of the first part, with the first magnet fixed to the inner surface of the second part of both yokes one by one, a recess provided on the part opposite to the first part of the first magnet, and the second magnet projected into the recess of the first magnet.

Alternatively, the invention is characterized in that, both yokes have a first part disposed opposite to the head and having a width smaller than the size of the head height, and a rectangular second part which is parallel with the first part and having a width larger than that of the first part, with the first magnet fixed to the inner surfaces of the respective first parts of both yokes and to both ends of the second parts, respectively, the first magnets fixed to both ends of the second part being provided with the projections projecting to the head side, respectively, and each of the second magnet being projected into the region surrounded by the two projecting parts and the second part.

In these configurations, into the recess provided on the first magnet, or into the region surrounded by the projection provided on the first magnet fixed to both ends of the second part and the second part, the second magnet provided on the head is projected. By the repulsive forces of the first magnet and the second magnet, the head is supported without contact between the head and second magnet and the first magnet and yoke. Further, the head driving coil fitted externally to the first part of the yoke without contact crosses the magnetic field formed by the bottom part of the recess of the first magnet provided on the inside of the second part of the yoke and the first part, or the magnetic field formed by the first magnet provided on the inside of the first part of the yoke and the part opposite to the first magnet, of the second part. When the head driving coil is energized, by the reciprocal action with the magnetic field, the head is advanced or retracted in the lengthwise direction of the first magnet.

Furthermore, in any of the configurations given above, the lens is held by the lens holder which is swingably supported in the direction crossing in orthogonal relation with the moving surface on which the head moves, said surface being determined by the opposed two first magnets, so that the optical axis of the lens is in said direction. The lens holder is disposed between the two second magnets which are provided respectively on the parts lying opposite to the two yokes of the head. The two second magnets are mutually in heteropolar relations. On the parts opposite to the two second magnets of the lens holder there are disposed the lens driving coils wound around the shaft orthogonal with the optical axis direction of lens and the lengthwise direction of the first magnet, respectively. The two coils are positioned in a part in the magnetic fields formed by the two second magnets.

According to said constitution, the two second magnets provided on both sides of the lens holder are mutually different poles, and there is formed a magnetic field directed from one second magnet to the other second magnet through the inside of the head. Between the two second magnets the lens holder holding the lens in a direction in which the optical axis is orthogonal with the moving surface of the head is supported swingably in said direction.

On the second magnet side of this lens holder, a coil wound around the axis which is orthogonal with the optical axis direction of the lens and the lengthwise direction of the first magnet, is provided so that a part of the coil is positioned in the magnetic field. Electric current is led to said coil, and the head is advanced or retracted in the direction of the optical axis of the lens by the reciprocal action with the magnetic field. In this manner, by the second magnet, the lens can be driven. As it is unnecessary to provide another magnet and yoke for driving the lens, the use amount of the magnet can be further reduced, and formation of the head into light weight can be expected.

The above and further objects and features of the invention will more fully be apparent from the following detailed description with accompanying drawings.

DETAILED DESCRIPTION OF THE INVENTION

Figure 1:
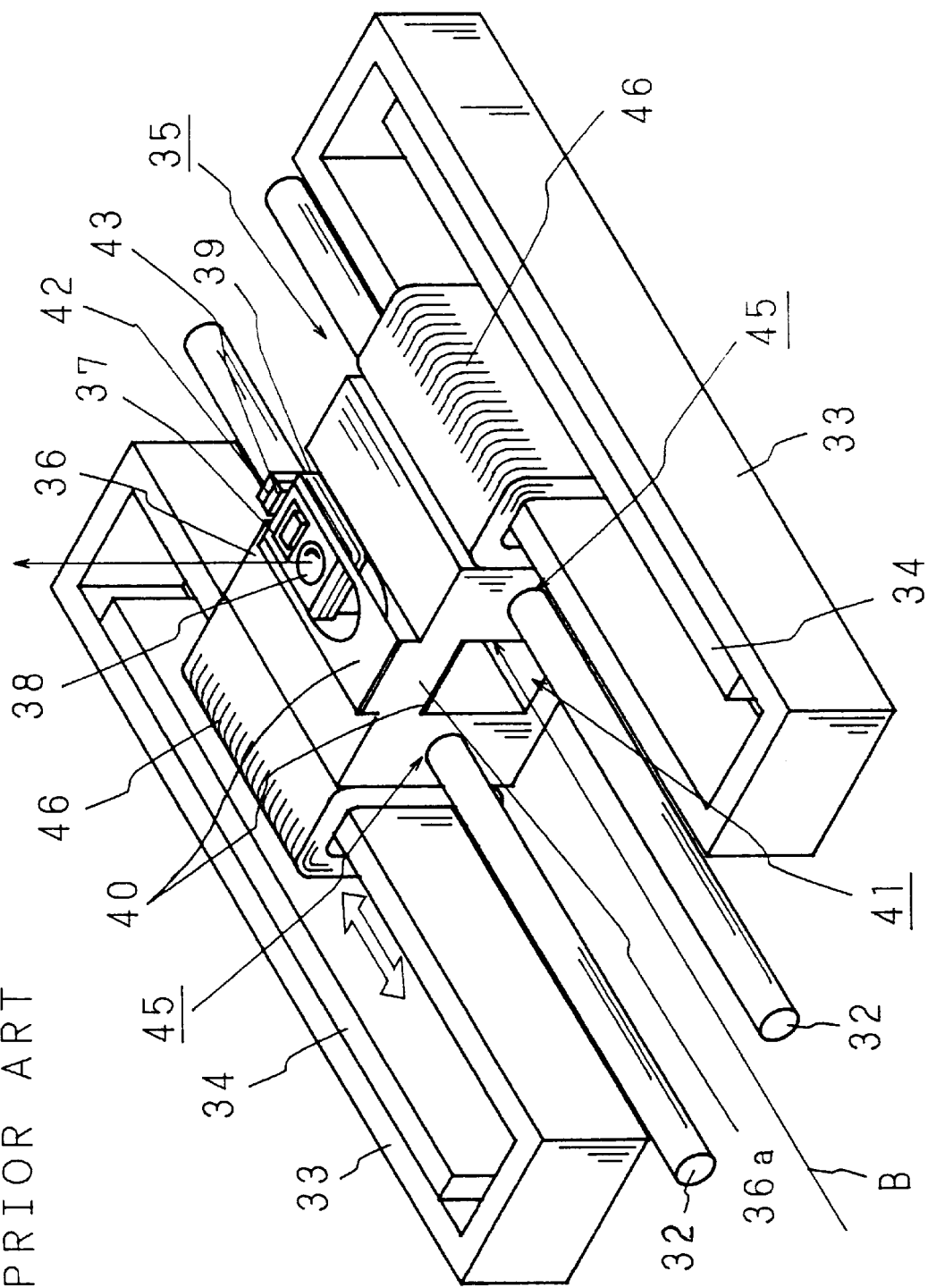
FIG. 1 is a perspective view showing a conventional head driving apparatus.
Figure 2:
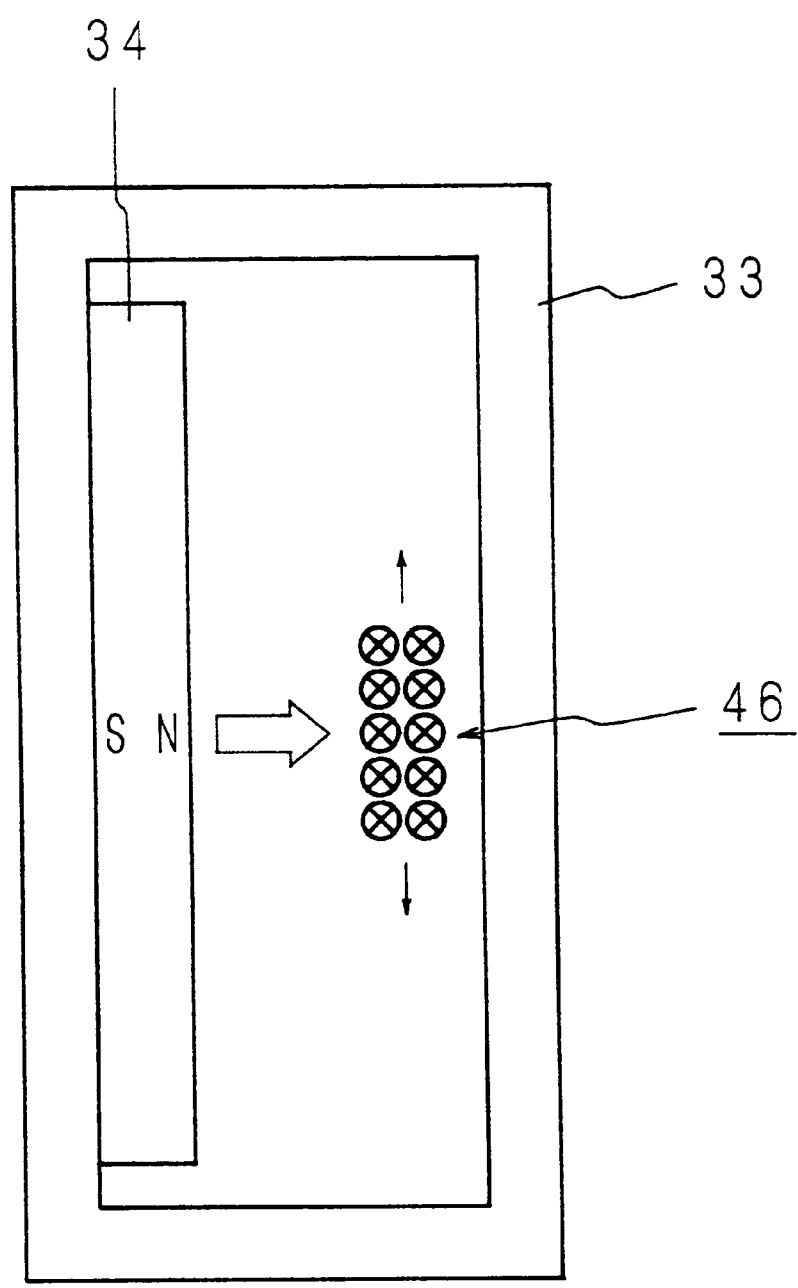
FIG. 2 is an explanatory view to illustrate the driving principle of the conventional head driving apparatus.
Figure 3:
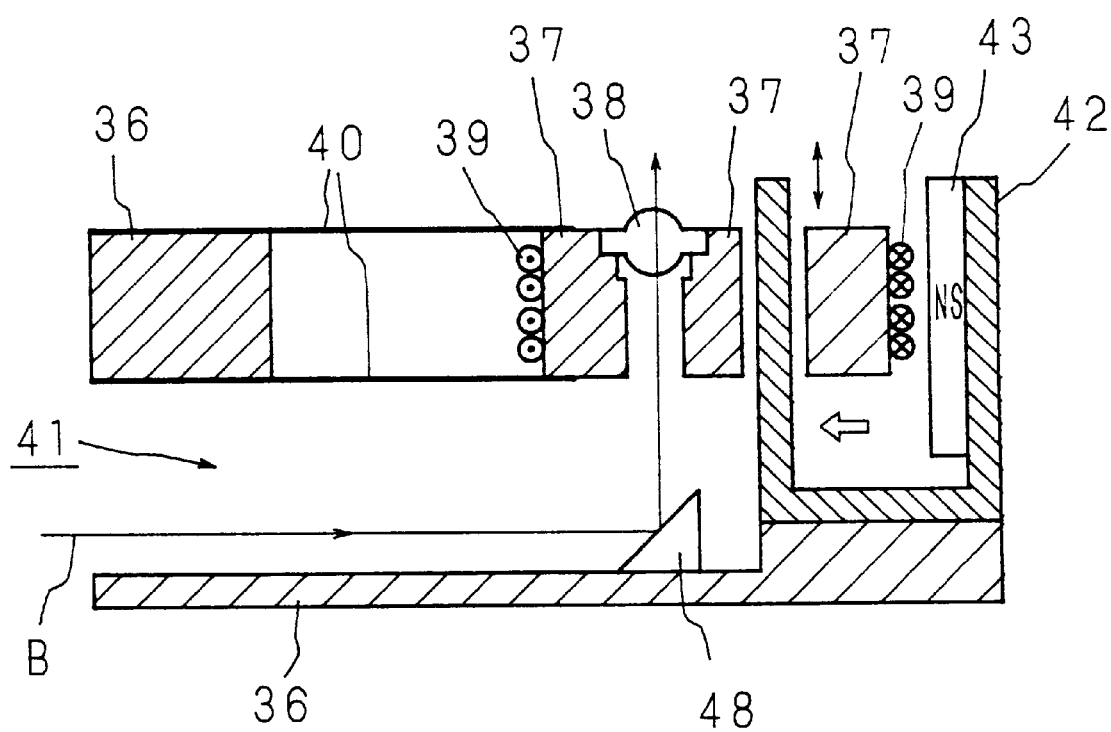
FIG. 3 is an explanatory view to illustrate the driving principle of the conventional lens driving apparatus.
Figure 4:
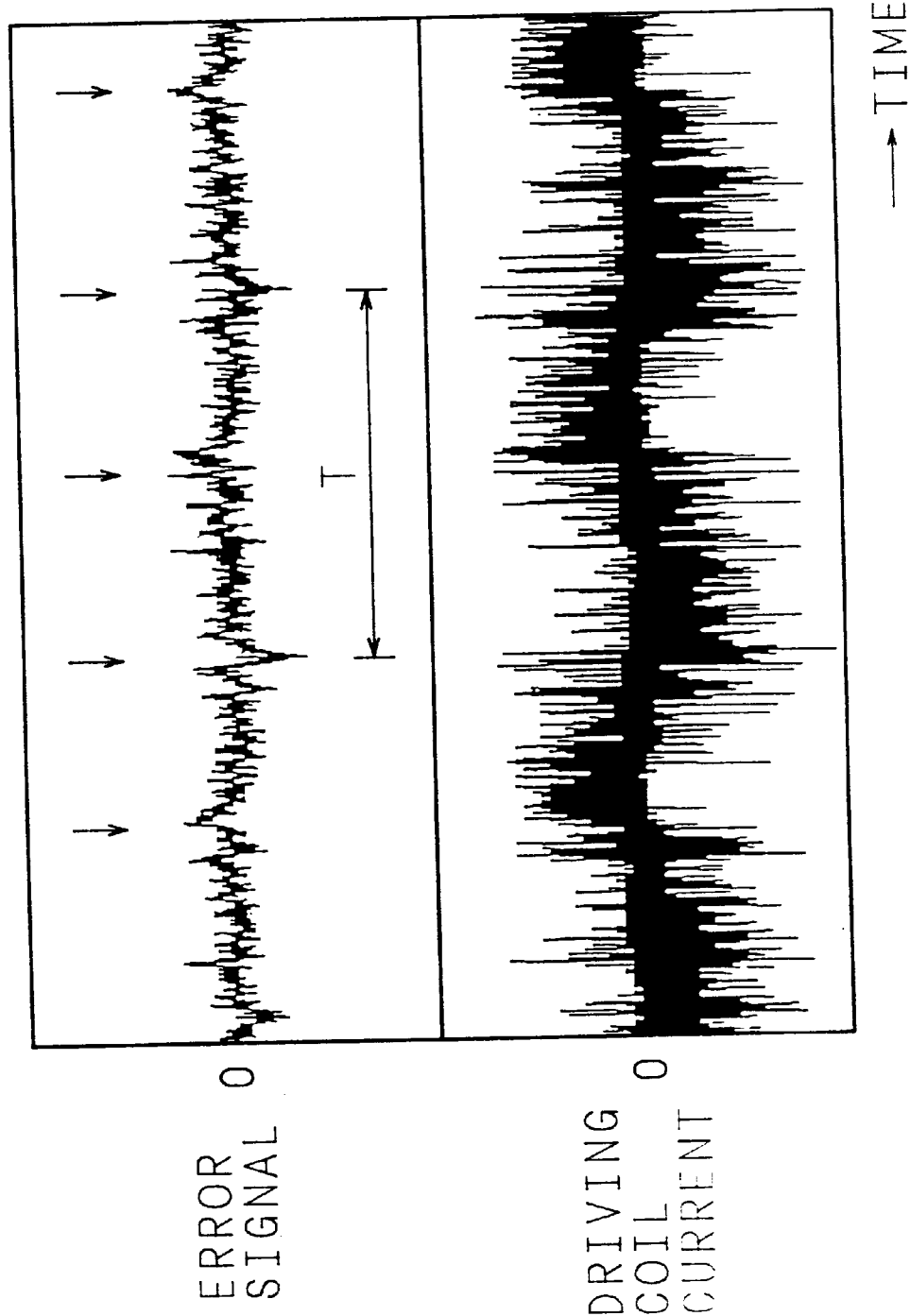
FIG. 4 is a graph to show the relationship between an error signal and a driving coil current in case of practicing the track control.

Hereinafter, the present invention is described in detail based on the drawing to show the embodiment thereof.

Embodiment 1

Figure 5:
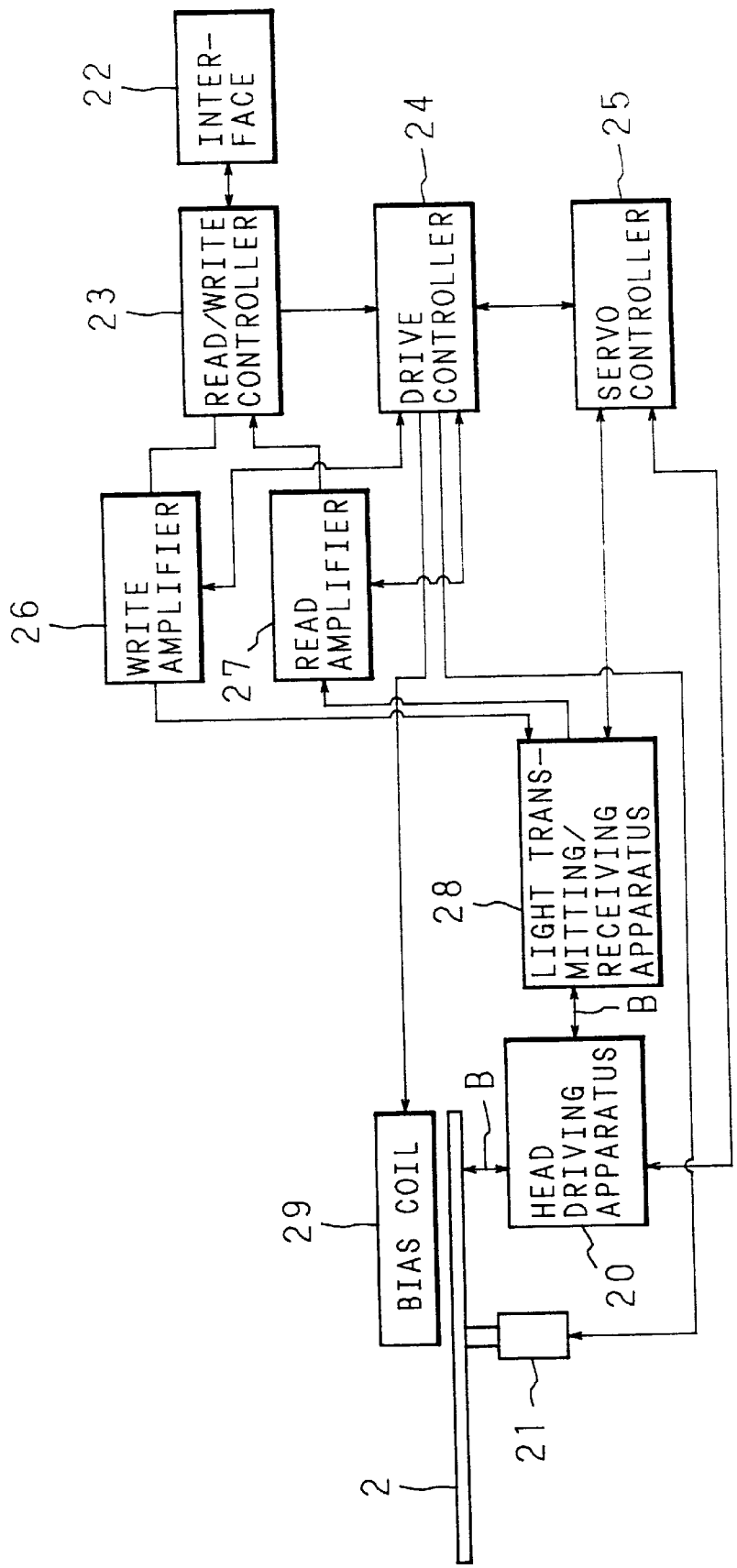
FIG. 5 is a block diagram showing a configuration of a optomagnetic disk apparatus of the present invention.

FIG. 5 is a block diagram showing components of a optomagnetic disk apparatus which is an example of the present invention. In the drawing, the numeral 2 denotes a disk. The disk 2 which is a recording medium is placed on a rotary spindle with the recording face disposed on the underside of the disk. The disk 2 is rotated at a predetermined speed by the spindle motor 21. On the underside of the disk 2, there is disposed a head driving apparatus 20 which has a head for irradiating the light beam to the recording surface of the disk 2 and receiving the reflective light from the disk 2 movably in the radial direction of the disk 2. On the outside of the disk 2, there is provided a light emitting and receiving apparatus 28 which is equipped with a light source for emitting the light beam B and a detector for detecting the received reflective light, and the like, opposite to the head. Also, on the upper side of the disk 2, there is arranged in opposite state the moving region of the head as described above a bias coil 29 for giving a predetermined magnetic field to the disk 2.

When a startup signal is given to a drive controller 24 through an interface 22 and a read/write controller 23, the drive controller 24 causes the spindle motor 21 which is a rotation driving unit to accelerate the disk 2 to the predetermined rotation speed and to rotate it at said rotation speed. When a write signal is given to the read/write controller 23, the read/write controller 23 causes the drive controller 24 and a servo controller 25 which is a drive controlling unit of the head to move the head of the head driving apparatus 20 to the predetermined track position of the disk 2, give the write signal amplified with a write amplifier 26 to a light transmitting/receiving apparatus 28 to irradiate the light beam B from the light transmitting/receiving apparatus 28 to project the light beam B to the disk 2 from the lens provided on the head of the head driving apparatus 20, and apply a magnetic field to the recording surface of the disk 2 by a bias coil 29 at a predetermined timing.

Also, when a read signal is given to the read/write controller 23, the read/write controller 23 causes the drive controller 24 and the servo controller 25 to move the head of the head driving apparatus 20 to the position of the predetermined track of the disk 2, irradiate the light beam from the transmitting/receiving apparatus 28 to project the light beam B to the disk 2, cause the transmitting/receiving apparatus 28 to detect said reflective light through the head, and output the detection signal amplified with the read amplifier 27 from the interface 22.

Figure 6:
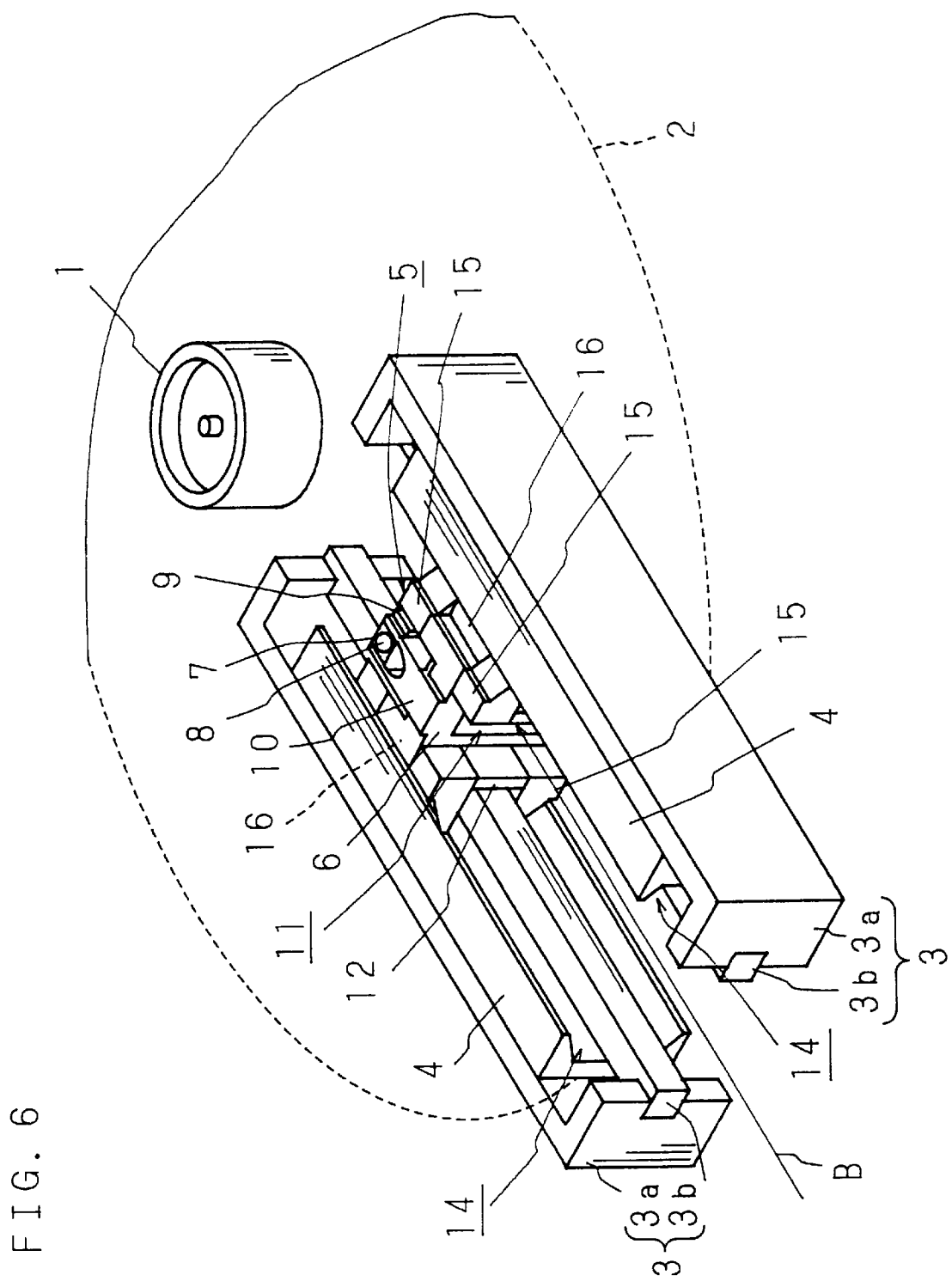
FIG. 6 is a perspective view to show a configuration of an essential part of an optical disk apparatus according to the present invention.

FIG. 6 is a perspective view showing components of an essential part of the optical disk apparatus according to the present invention. In the drawing, the numeral 1 shows a rotary spindle which shows rotary driving at a predetermined revolution. On the rotary spindle 1, a disk 2 is detachably mounted in a manner to make the recording surface the lower side of the disk. The disk 2 is driven in rotation around the axis according to the rotation of the rotary spindle 1. Underneath the disk 2, there are two yokes 3,3 which have the rectangular frame shape in plan view and approximately the same length as the radius of the disk 2, disposed in parallel in a direction orthogonal with the radial direction of the disk 2 at a predetermined distance, in a manner that the openings of the two yokes 3, 3 are disposed opposite to the disk 2. Between the yokes 3, 3 there is a head 5 to be described later.

Longer side walls of the yokes 3, 3 on the head 5 side are made of bar members (first part) 3b, 3b. The yokes 3, 3 are formed by engaging the bar-form members 3b, 3b in the recesses provided respectively at the centers at both ends of the three-side-wall members (including a second part of the rectangle) 3a, 3a excluding the bar members 3b, 3b. On the inner surfaces of the longer side walls of the yokes 3, 3, there are fixed the first magnets 4, 4 of approximately rectangular parallelepiped form of the approximately same length as the yoke 3, having trapezoidal grooves (recesses) 14, 14 on the portions corresponding to the bar members 3b, 3b. The upper marginal parts and lower marginal parts of the grooves 14, 14 project to the upper part and the lower part of the bar members 3b, 3b.

Figure 7:
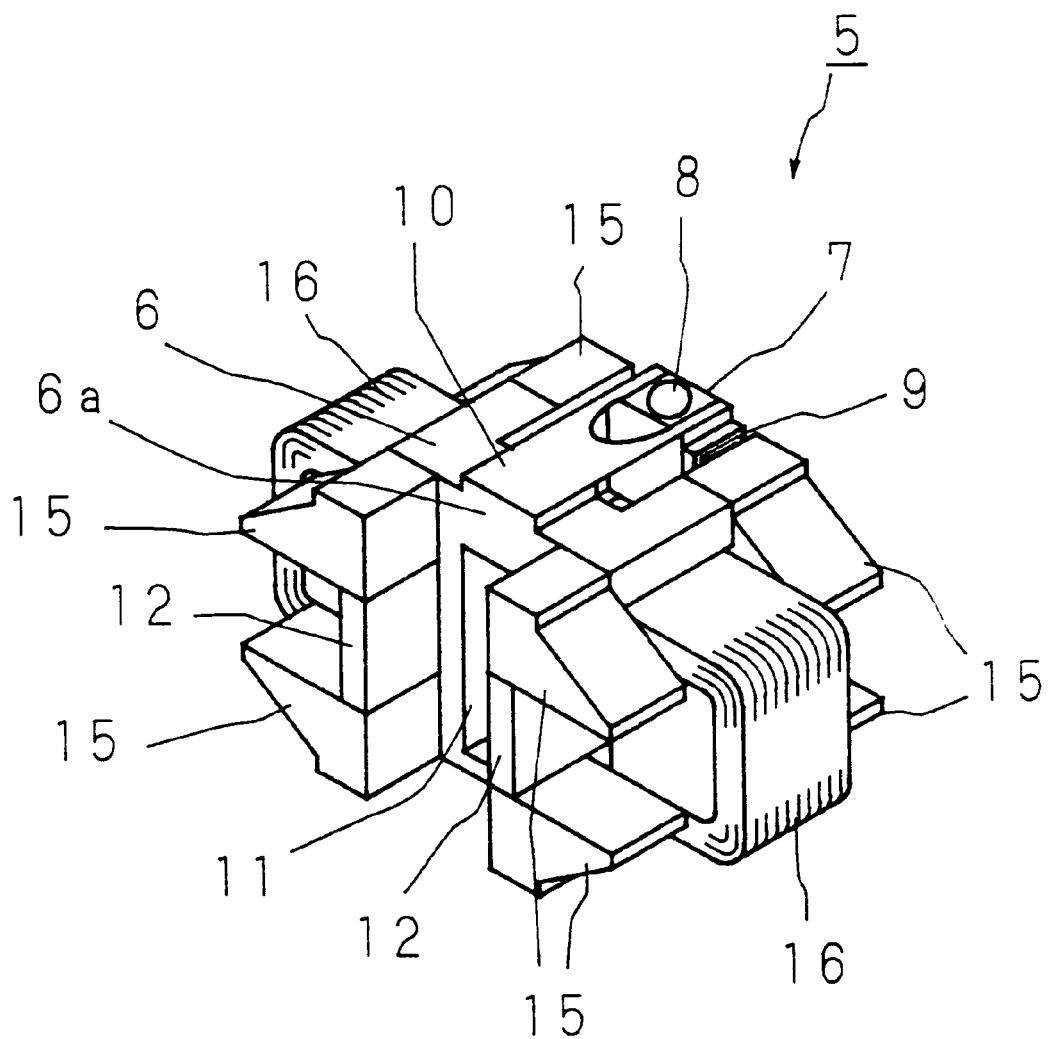
FIG. 7 is a perspective view of the head shown in FIG. 6.
Figure 8:
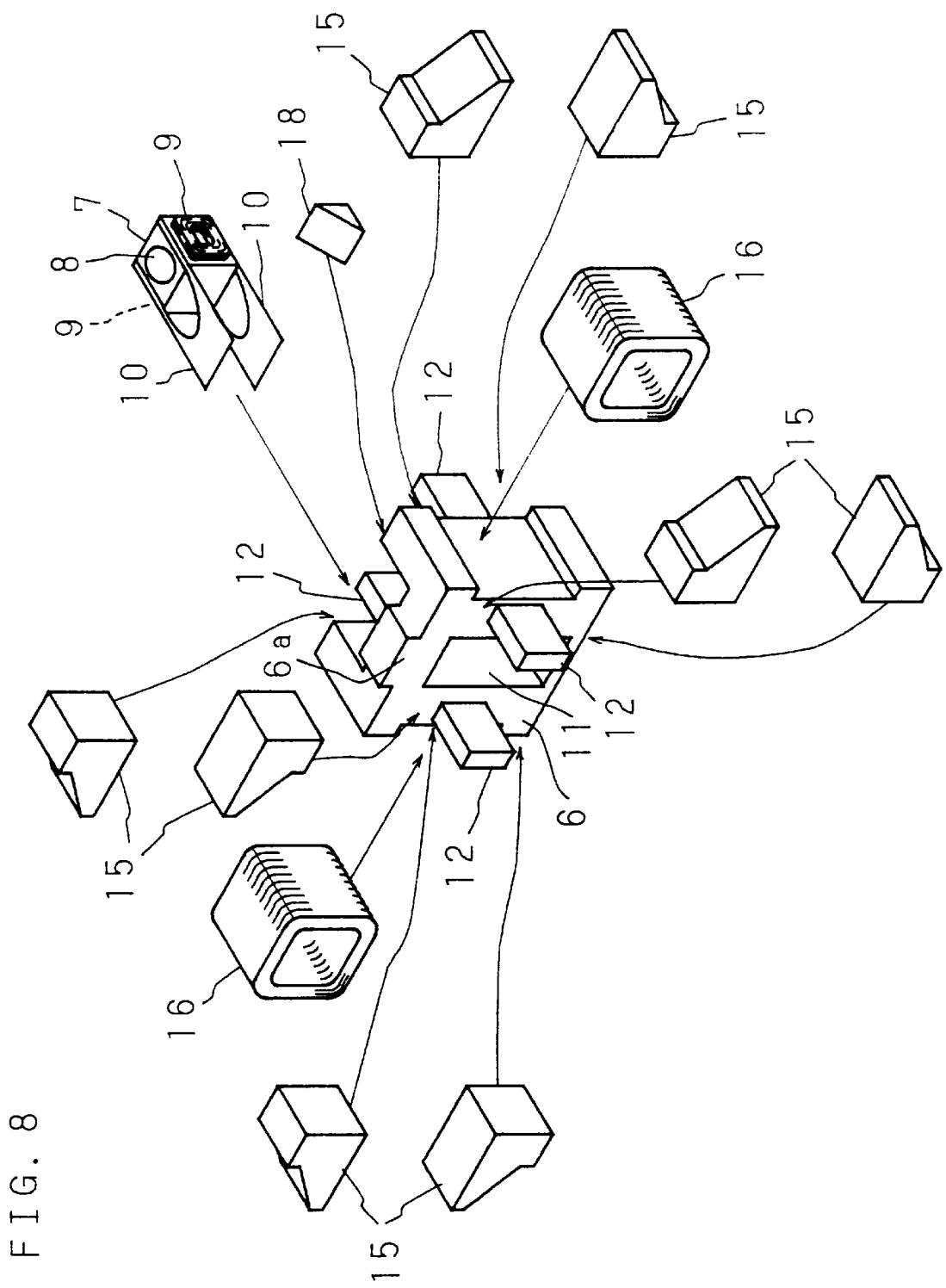
FIG. 8 is an assembly view of the head.

With respect to the structure of the head 5, explanation is made with reference to FIG. 7 and FIG. 8. FIG. 7 is a perspective view of the head 5 shown in FIG. 6, and FIG. 8 is an assembled view of the head 5. At the front central part of the carriage 6 having approximately rectangular parallelepiped form which is a main body of the head 5, there is provided a light conductive hole 11 for leading the light beam B, so that the light beam B from the light source disposed opposite to the light conductive hole 11 is incident in the light conductive hole 11. The portion opposite to the light conductive hole 11 on the upper surface of the carriage 6 has an opening formed with the margin left in the vicinity of one end part in the direction of provision of the light conductive hole 11, and the remaining part is to be a supporting part 6a of the lens holder 7 to be described later. To the upper and lower surfaces of the supporting part 6a one ends of the leaf springs 10, 10 which have the U-letter shaped notches at the other ends are fixed, respectively.

The lens holder 7 has a tubular shape with approximately square cross-section in plan view, and is supported in cantilever by the leaf springs 10, 10 which are fixed at their one ends to the upper and lower surfaces of the supporting part 6a. In the lens holder 7, an objective lens 8 is fixed in parallel with the upper surface of the carriage 6, and the objective lens 8 is to condense the light beam B risen up by the rising mirror 18 which is disposed in opposed state underneath thereof and project to the disk 2.

At the central parts of the side surfaces of the carriage 6, there are provided recesses, respectively. To both recesses the driving coils 16, 16 having square tubular shape when viewed from front, are fixed so that their openings are in parallel with the light conductive hole 11. On the front and back surfaces of the carriage 6, on both sides of the light conductive hole 11 there are erected supporting plates 12, 12, 12, 12 having widths of the same size as the openings of the driving coils 16, 16, with their positions in vertical direction set to agree with the openings. To eight L-letter shaped parts constituted by the top ends or bottom ends of the respective supporting plates 12, 12, 12, 12 and the front or back surface of the carriage 6, eight columnar second magnets 15, whose front views are approximately rectangular parallelepiped are fixed so that the upper side four second magnets 15 are disposed with the oblique surface upside, and the lower side four second magnets 15 are disposed with the oblique surface downside.

The lens holder 7 is supported, between the two magnets 15 on the upper side of the back side, under the condition of projecting by about half from the upper ends of the two second magnets 15. On the sides opposite to the two second magnets 15 of the lens holder 7, there are fixed the focusing coils 9 wound in multiplex around an axis which passes through the central part of both side surfaces. The upper side parts of the two focusing coils 9 are positioned higher than the upper ends of the second magnets 15.

And, the bar members 3b, 3b are inserted in the space between the openings of the driving coils 16 and the upper four second magnets 15, and the lower four second magnets 15. At this time, the slopes of the eight second magnets 15 and the projections of the first magnets 4 are to be disposed opposite. By the repulsive forces of the first and second magnets the head 5 is supported in non-contact state, and by the reciprocal actions between the magnetic field formed by the first magnets 4 and the yokes 3 and the electric current led to the driving coils 16, the head 5 is moved to the lengthwise direction of the first magnets 4, namely, in the radial direction of the disk 2, to carry out access track control. Furthermore, by the reciprocal actions between the magnetic field formed by the second magnets 15 lying on both sides of the lens holder 7 and the current led to the focusing coils 9, the lens holder 7 and the objective lens 8 held by the lens holder 7 are moved in the direction of the optical axis of the objective lens 8, i.e., in the direction orthogonal to the surface of the disk 2 to effect focus control.

Detailed description is given on the operating principle of the head driving apparatus mentioned above.

Figure 9:
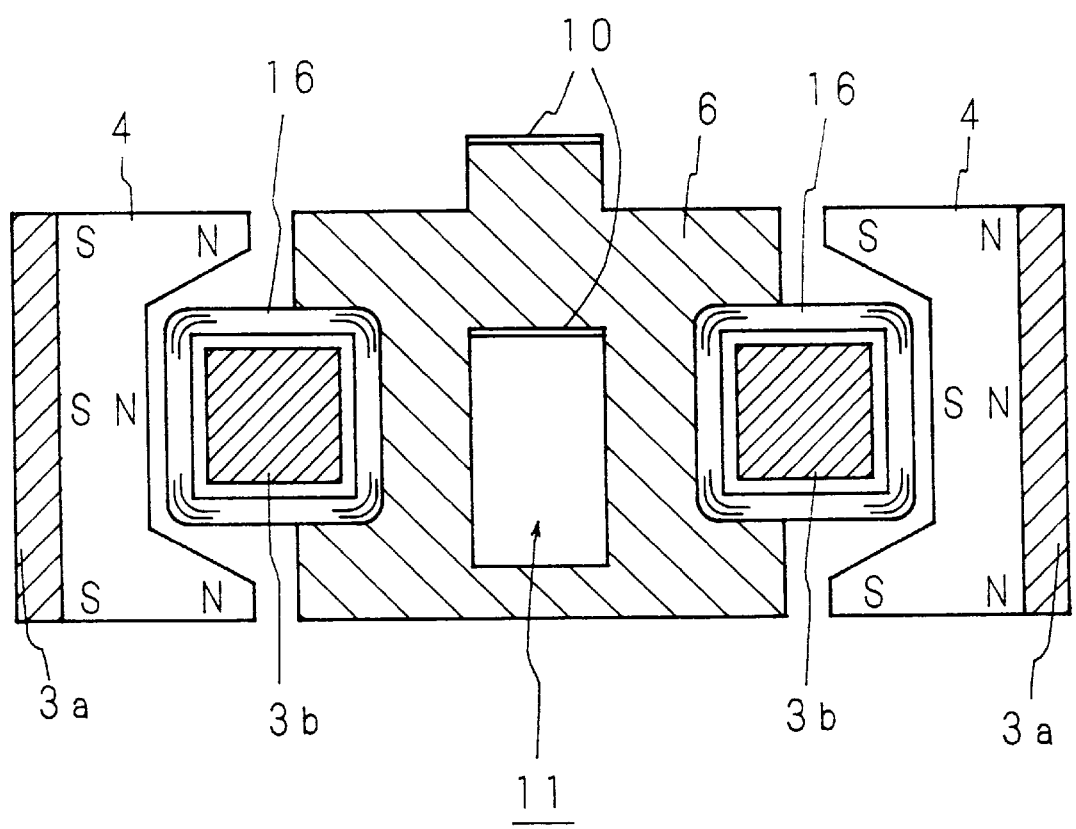
FIG. 9 is an explanatory view to illustrate the driving principle of the head driving apparatus shown in FIG. 6 in relation to the access track control.
Figure 10:
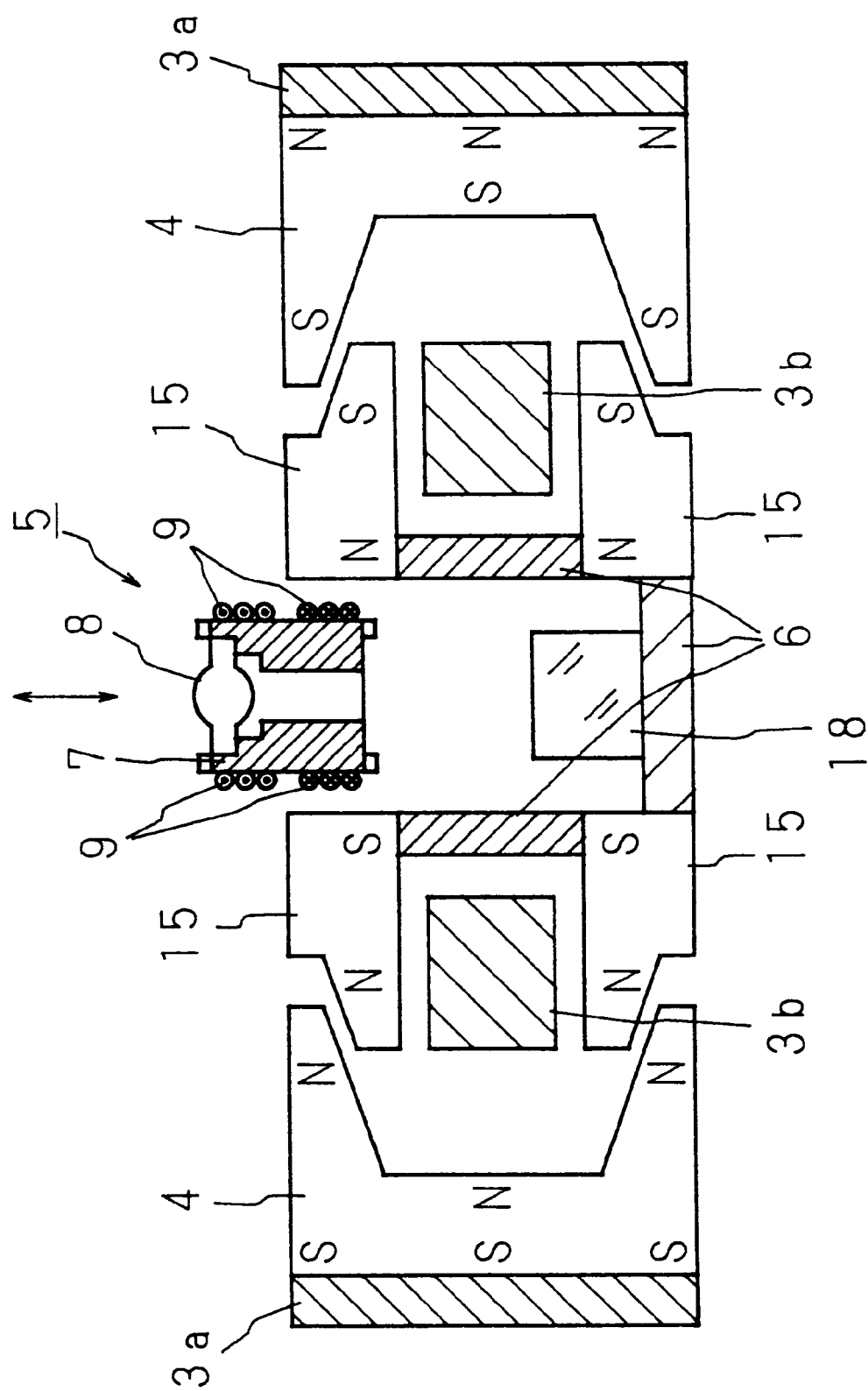
FIG. 10 is an explanatory view to illustrate the driving principle of the head driving apparatus shown in FIG. 6 in relation to the focus control.

FIG. 9 is a view to illustrate the driving principle of the head driving apparatus shown in FIG. 6 in relation to the access tracking control. FIG. 10 is an illustrative view to explain the driving principle of the head driving apparatus shown in FIG. 6 in relation to the focusing control. In FIGS. 9 and 10, the portions corresponding to FIGS. 6, 7 and 8 are indicated in the same numbers and their explanations are omitted. As shown in FIG. 9, the opposed portions of the two first magnets 4 are mutually made into the different poles. As described above, the driving coils 16 are externally fitted to the bar members 3b, 3b of the yokes 3. The driving coils 16 cross the magnetic field formed by the first magnets 4, 4 which are fixed to the yokes 3, 3 and the bar members 3b, 3b. When the current in mutually inverse direction is led to the driving coils 16, 16, the head 5 advances or retracts in the lengthwise direction of the yokes 3, 3 by the reciprocal actions with the magnetic field as described above.

Also, as shown in FIG. 10, the first magnets 4, 4 are mutually set to be the same poles with the second magnets 15, 15 . . . opposite thereto, because of which the first magnets 4, 4 and the second magnets 15, 15 repel one another, and by said repulsive force the head 5 is supported in non-contact state. On the other hand, because the second magnets 15, 15 which are disposed on both side surfaces of the carriage 6 have the inverse polarities, between the second magnets 15, 15 lying on both side surfaces of the lens holder 7, a magnetic field which is approximately vertical to said side surface is formed. Because the lower side portions of the focusing coils 9, 9 provided on the lens holder 7 are positioned in said magnetic field, when the current of the same direction is led to the focusing coils 9, 9, the lens holder 7 and the objective lend 8 advance or retract in the direction of the optical axis of the objective lens 8, by the reciprocal actions with the magnetic field as described above and the spring force of the leaf springs 10, 10 (ref. FIG. 6).

In this embodiment, the amount of use of the magnet in case of supporting the head under non-contact state is decreased, and the number of parts can be reduced by supporting the first magnet by the yoke. Accordingly, the production cost is low.

Moreover, as it is unnecessary to provide any additional magnet or yoke for driving the lens, the amount of use of the magnet can be further reduced, and the head can be formed in lightweight.

Embodiment 2

Figure 11:
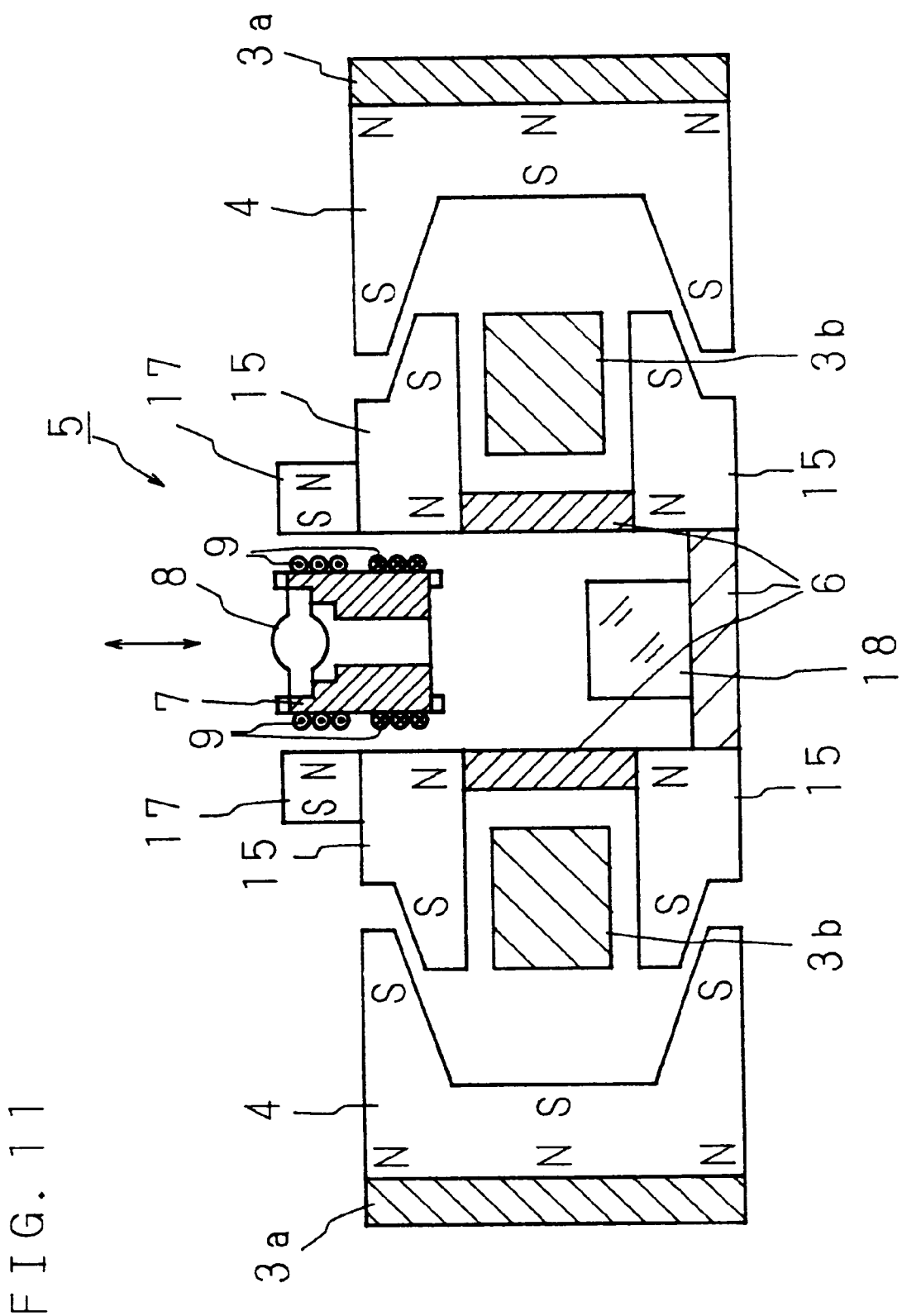
FIG. 11 is a schematic front sectional view showing Embodiment 2.

FIG. 11 is a schematic front sectional view to show Embodiment 2, which denote the case where other magnets for focusing control are provided on the head 5. In the figure, the parts corresponding to those in FIG. 10 are indicated by the same numbers and their illustration omitted. As shown in FIG. 11, in this embodiment, the opposite parts in the first magnets 4, 4 are of the same poles, and the second magnets 15, 15 opposite to the focusing coils 9, 9 are also of the same poles, and there is no magnetic field approximately vertical to the side surface of the lens holder 7 formed between the two second magnets 15, 15. The head 5 is opposite to the upper half portions of the focusing coils 9, 9, and focus driving magnets 17, 17 are provided on the upper surfaces of these second magnets 15, 15, respectively, so that the mutually opposed parts are of different poles. When the current of the same running direction is led to the focusing coils 9, 9 lying in the magnetic field produced by the two focus driving magnets 17, 17, the lens holder 7 and the objective lens 8 advance or retract in the direction of the optical axis of the objective lens 8 by the reciprocal action with the magnetic field as mentioned above.

In the present invention, the use of the magnets in the case of supporting the head under no contact can be reduced, and the number of parts can be reduced by supporting the first magnet by the yokes. Accordingly, the production cost is low.

Embodiment 3

Figure 12:
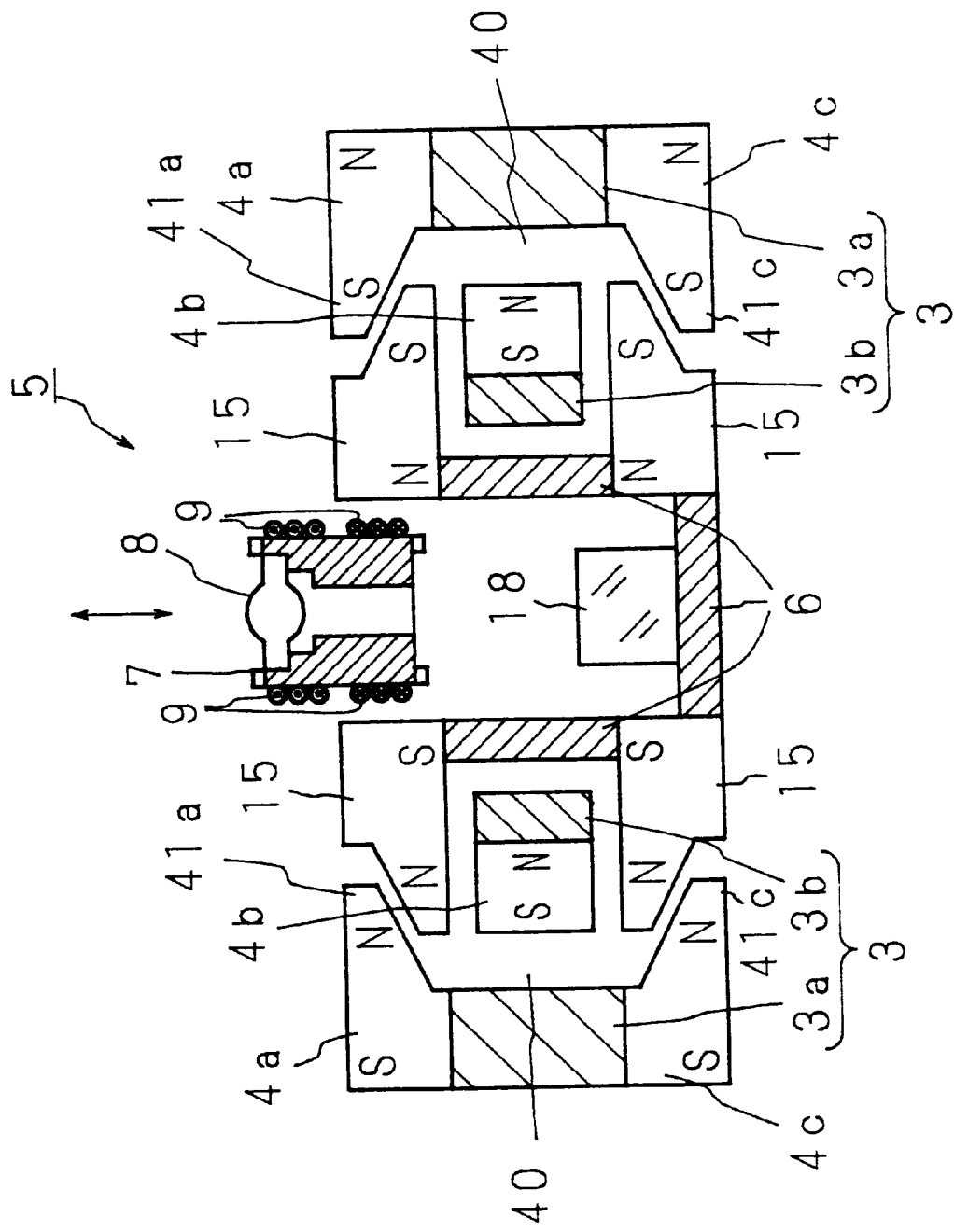
FIG. 12 is a schematic front sectional view showing Embodiment 3.
Figure 13:
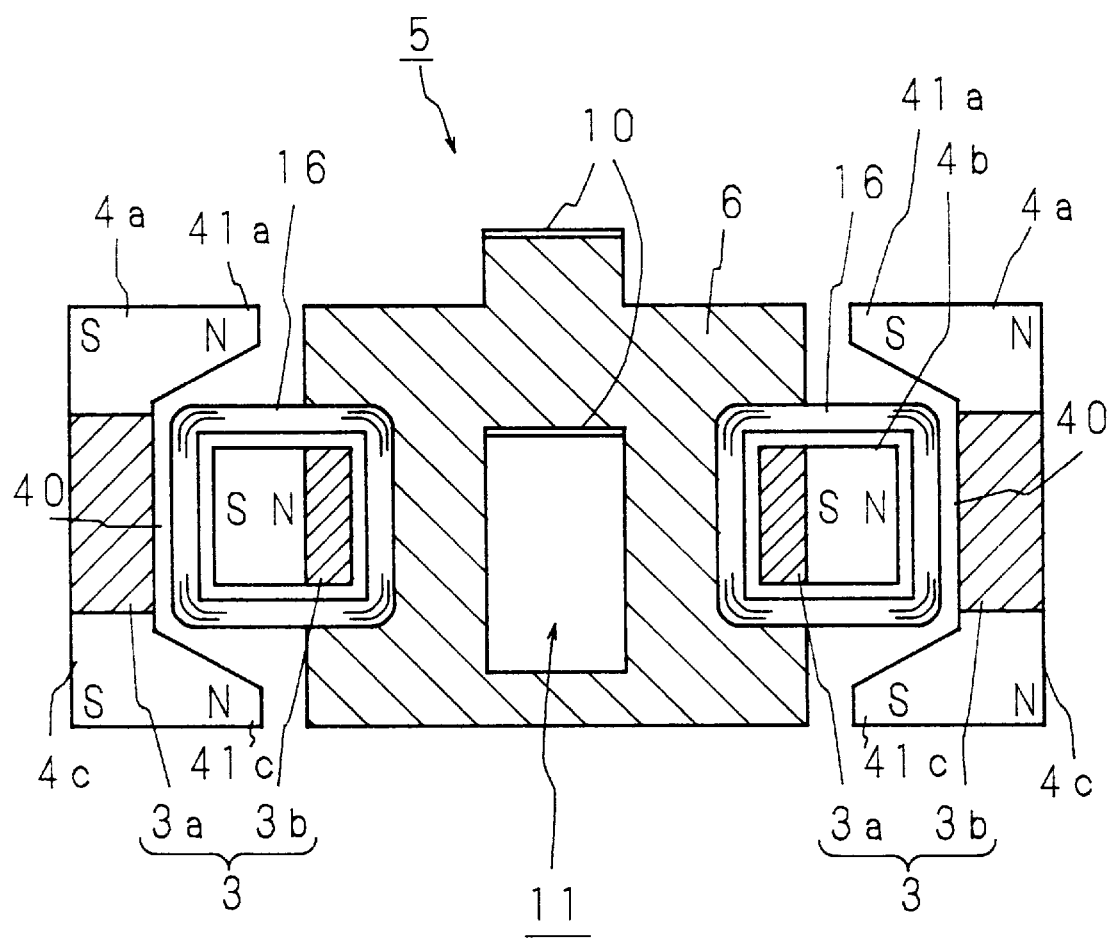
FIG. 13 is a schematic front sectional view showing Embodiment 3.

FIGS. 12 and 13 are schematic front sectional views showing Embodiment 3, which show the case where the first magnet comprising the plural parts is used. In the drawings, the parts corresponding to FIGS. 9 and 10 are indicated by the same numbers and description thereon omitted. As shown in FIGS. 12 and 13, in this embodiment, by shortening the lengths in the vertical direction of the three-side-surface members 3a, 3a of the yokes 3, 3 and fixing to their upper ends and lower ends the first magnets 4a, 4a, 4c, 4c which have approximately the same length as the three-side-surface members 3a, 3a and approximately rectangular parallelepiped shape in front view so that the slopes of the first magnets 4a, 4a, 4c, 4c are in parallel with the slopes of the second magnets 15, 15, . . . , there are formed the projections 41a, 41a, 41c, 41c which project to the head 5 side from the three-side-surface members 3a, 3a in the first magnets 4a, 4a, 4c, 4c. The second magnets 15, 15, . . . project into the regions 40, 40 which are surrounded by the projection part 41a, three-side-surface member 3a and projection 41c. By the repulsive forces between the projections 41a, 41a, 41c, 41c of the first magnets 4a, 4a, 4c, 4c and the second magnets 15, 15, . . . , the head 5 is supported under no contact state. Furthermore, the second magnets 15, 15 which are disposed by holding the carriage 6 in-between have reverse polarities, so that, by the reciprocal actions between the magnetic field formed by the second magnets 15, 15 opposite to the focusing coils 9, 9 provided on the lens holder 7 and the electric current led to the focusing coils 9, 9, the lens holder 7 and the objective lens 8 are advanced or retracted in the direction of the optical axis of the objective lens 8.

Moreover, onto the surfaces opposite to the three-side-surface members 3a, 3a of the bar-form members 3b, 3b of the yokes 3, 3 there are fixed the first magnets 4b, 4b, and there is formed a magnetic field which directs from the first magnets 4b, 4b to the three-side-surface members 3a, 3a. The driving coils 16, 16 are externally fitted on the first magnets 4b, 4b and bar-form members 3b, 3b. When the required current is led to the driving coils 16, 16, the head 5 is advanced or retracted in the lengthwise direction of the yokes 3, 3, i.e., radial direction of the disk, by the reciprocal action with the magnetic field.

In this embodiment, the same effects as those of Embodiment 1 are obtainable.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. A head driving apparatus comprising:
    a lens holder for fixedly holding a lens for condensing light beam;
    a lens driving coil fixed to said lens holder;
    a head having two side surfaces which are opposite to each other with respect to an optical axis of said lens, said said head freely swingably supporting said lens holder so as to move said lens in the direction of its optical axis;
    two yokes, each having two generally parallel members which extend respectively in the direction generally perpendicular to said optical axis, said yokes being disposed on both sides of the two side surfaces of said head so that one member of each said yoke is near to said head and the other member of each said yoke is remote from said head;
    two tubular head driving coils fitted externally on the member of each said yoke which is nearer to the head, and being fixed respectively to two side surfaces of said head so that the axes thereof are parallel with the lengthwise direction of said yoke;
    a plurality of first magnets having approximately the same length as the length of said yoke, at least one of which being fixed to said other member of each yoke that is lying further from said head than said nearer members; and
    a plurality of second magnets fixed to the two side surfaces of said head so as to oppose to the first magnets,
    wherein the head is supported in non-contact state by the repulsive forces of the first magnets and the second magnets,
    said head is driven to the lengthwise direction of the first magnet by energizing the head driving coils, and
    said lens driving coil is energized to swing said lens holder which moves said lens in the direction of said optical axis.

2. A head driving apparatus according to claim 1, wherein the nearer member of each said yoke has a rectangular section perpendicular to said lengthwise direction, and said head driving coil has a square tubular shape corresponding to said section of said member.

3. A head driving apparatus according to claim 1, wherein the lens driving coils are disposed on both sides of the lens holder so that a part of each coil is positioned between a pair of second magnets holding said head, and coiled around a shaft orthogonal to said optical axis and the lengthwise direction of the first magnet.

4. A head driving apparatus according to claim 3, wherein the second magnets which are positioned on both sides of said lens driving coils are mutually different poles, with the winding directions of said lens driving coils are the same.

5. A head driving apparatus according to claim 1, wherein
    said nearer member of said yoke has a first part which is smaller in the optical axis direction of said lens than said head,
    said farther member of said yoke has a second part larger than the first part,
    each first magnet is fixed to the inside of a said farther member with a recess provided on the portion of the first magnet opposite to the first part, and each second magnet is projected to the recess of the first magnet.

6. A head driving apparatus according to claim 5, further comprising:
    a lens driving coil disposed on each side of said lens holder so that each of the coils is positioned between a pair of second magnets opposite to each other with respect to said head, and each coil is wound around an axis orthogonal to said optical axis and the lengthwise direction of the first magnet.

7. A head driving apparatus according to claim 6, wherein the second magnets which are positioned on both sides of said lens driving coils are mutually different poles, with the winding directions of said lens driving coils being the same.

8. A head driving apparatus according to claim 1, wherein
    said nearer member of said yoke has a first part which is smaller in the optical axis direction of said lens than said head,
    said farther member of said yoke has a second part larger than the first part,
    each first magnet is fixed to the inside of one said nearer member of both yokes,
    a pair of first magnets projecting to said head side are fixed to both ends in the direction of optical axis of said farther members of both yokes, respectively, and
    each of the second magnets is projected into the region surrounded by each pair of projections of the first magnets and the second parts.

9. A head driving apparatus according to claim 5, further comprising:
    a lens driving coil disposed on each side of said lens holder so that each of the coils is positioned between a pair of second magnets opposite to each other with respect to said head, and each coil is wound around an axis orthogonal to said optical axis and the lengthwise direction of the first magnet.

10. A head driving apparatus according to claim 9, wherein the second magnets which are positioned on both sides of said lens driving coils are mutually different poles, with the winding directions of said lens driving coils being the same.

11. An optical disk apparatus, comprising:
    a rotary driving part for rotating a disk recording medium;
    a head having a lens for condensing the light beam;
    a head driving apparatus according to claim 1 for driving said head in the radial direction of said recording medium;
    a drive controller for energizing said head driving coil to control the action of driving said head in the lengthwise direction of the first magnet; and
    a light transmitting and receiving unit for emitting light to said lens and receiving a light beam reflected by said recording medium for recording and/or reproducing information.

12. An optical disk apparatus, comprising:

a rotary driving part for rotating a disk-form recording medium;

a head having a lens for condensing the light beam;

a head driving apparatus according to claim 2 for driving said head in the radial direction of said recording medium;

a drive controller for energizing said head driving coil to control the action of driving said head in the lengthwise direction of the first magnet; and a light transmitting and receiving unit for emitting light to said lens and receiving a light beam reflected by said recording medium for recording and/or reproducing information.

13. An optical disk apparatus, comprising:

a rotary driving part for rotating a disk-form recording medium;

a head having a lens for condensing the light beam;

a head driving apparatus according to claim 3 for driving said head in the radial direction of said recording medium;

a drive controller for energizing said head driving coil to control the action of driving said head in the lengthwise direction of the first magnet; and a light transmitting and receiving unit for emitting light to said lens and receiving a light beam reflected by said recording medium for recording and/or reproducing information.

14. An optical disk apparatus, comprising:

a rotary driving part for rotating a disk-form recording medium;

a head having a lens for condensing the light beam;

a head driving apparatus according to claim 4 for driving said head in the radial direction of said recording medium;

a drive controller for energizing said head driving coil to control the action of driving said head in the lengthwise direction of the first magnet; and a light transmitting and receiving unit for emitting light to said lens and receiving a light beam reflected by said recording medium for recording and/or reproducing information.

15. An optical disk apparatus, comprising:

a rotary driving part for rotating a disk-form recording medium;

a head having a lens for condensing the light beam;

a head driving apparatus according to claim 5 for driving said head in the radial direction of said recording medium;

a drive controller for energizing said head driving coil to control the action of driving said head in the lengthwise direction of the first magnet; and a light transmitting and receiving unit for emitting light to said lens and receiving a light beam reflected by said recording medium for recording and/or reproducing information.

16. An optical disk apparatus, comprising:

a rotary driving part for rotating a disk-form recording medium;

a head having a lens for condensing the light beam;

a head driving apparatus according to claim 6 for driving said head in the radial direction of said recording medium;

a drive controller for energizing said head driving coil to control the action of driving said head in the lengthwise direction of the first magnet; and a light transmitting and receiving unit for emitting light to said lens and receiving a light beam reflected by said recording medium for recording and/or reproducing information.

17. An optical disk apparatus, comprising:

a rotary driving part for rotating a disk-form recording medium;

a head having a lens for condensing the light beam;

a head driving apparatus according to claim 7 for driving said head in the radial direction of said recording medium;

a drive controller for energizing said head in the lengthwise direction of the first magnet; and a light transmitting and receiving unit for emitting light to said lens and receiving a light beam reflected by said recording medium for recording and/or reproducing information.

18. An optical disk apparatus, comprising:

a rotary driving part for rotating a disk-form recording medium;

a head having a lens for condensing the light beam;

a head driving apparatus according to claim 8 for driving said head in the radial direction of said recording medium;

a drive controller for energizing said head driving coil to control the action of driving said head in the lengthwise direction of the first magnet; and a light transmitting and receiving unit for emitting light to said lens and receiving a light beam reflected by said recording medium for recording and/or reproducing information.

19. An optical disk apparatus, comprising:

a rotary driving part for rotating a disk-form recording medium;

a head having a lens for condensing the light beam;

a head driving apparatus according to claim 9 for driving said head in the radial direction of said recording medium;

a drive controller for energizing said head driving coil to control the action of driving said head in the lengthwise direction of the first magnet; and a light transmitting and receiving unit for emitting light to said lens and receiving a light beam reflected by said recording medium for recording and/or reproducing information.

20. An optical disk apparatus, comprising:

a rotary driving part for rotating a disk-form recording medium;

a head having a lens for condensing the light beam;

a head driving apparatus according to claim 10 for driving said head in the radial direction of said recording medium;

a drive controller for energizing said head driving coil to control the action of driving said head in the lengthwise direction of the first magnet; and a light transmitting and receiving unit for emitting light to said lens and receiving a light beam reflected by said recording medium for recording and/or reproducing information.

* * * * *

UNITED STATES PATENT AND TRADEMARK OFFICE
CERTIFICATE OF CORRECTION

PATENT NO. : 6,026,064
DATED : February 15, 2000
INVENTOR(S) : Izumi et al.

It is certified that error appears in the above-identified patent and that said Letters Patent is hereby corrected as shown below:

Claim 1,
Line 2, after "condensing" insert -- a --
Line 7, delete "said" (first occurrence)

Signed and Sealed this

Twentieth Day of November, 2001

Attest:

*Nicholas P. Godici*

NICHOLAS P. GODICI
*Acting Director of the United States Patent and Trademark Office*

*Attesting Officer*